United States Patent [19]

Charland

[11] Patent Number: 4,854,138

[45] Date of Patent: Aug. 8, 1989

[54] RESTRAINING DEVICE

[76] Inventor: Robert S. Charland, 52 Park Ter., Sherrill, N.Y. 13461

[21] Appl. No.: 155,091

[22] Filed: Feb. 11, 1988

[51] Int. Cl.<sup>4</sup> ............................................. E05B 75/00
[52] U.S. Cl. ...................................... 70/16; 70/30; 70/57; 24/30.5 R; 119/96; 128/878
[58] Field of Search ..................... 70/14–19, 70/30, 49, 57; 128/133, 134; 24/16 PB, 16 R, 30.5 R, 115 H, 129 R, 129 D; 119/151, 96

[56] References Cited

U.S. PATENT DOCUMENTS

| | | | |
|---|---|---|---|
| 2,425,489 | 8/1947 | Peterson | 70/16 X |
| 2,832,116 | 4/1958 | Clevett et al. | 24/30.5 R |
| 3,108,292 | 10/1963 | Bodnar et al. | 128/134 |
| 3,426,559 | 2/1969 | Schubach et al. | 70/16 |
| 3,516,124 | 6/1970 | Merser | 24/16 PB |
| 3,864,790 | 2/1975 | Reinwall, Jr. | 24/30.5 R X |
| 4,024,604 | 5/1977 | Klimek et al. | 24/16 R |
| 4,071,023 | 1/1978 | Gregory | 70/16 X |
| 4,137,606 | 2/1979 | Wood | 24/16 PB |
| 4,351,169 | 9/1982 | Plymale | 70/16 |
| 4,527,308 | 7/1985 | Tritton et al. | 24/30.5 R |
| 4,529,240 | 7/1985 | Engel | 24/129 R X |
| 4,638,764 | 1/1987 | Anderson | 119/96 |
| 4,665,590 | 5/1987 | Udelhofen et al. | 24/30.5 R X |
| 4,680,834 | 7/1987 | Andre et al. | 24/16 PB |
| 4,730,615 | 3/1988 | Sutherland | 24/16 PB |

FOREIGN PATENT DOCUMENTS 1095864  2/1981  Canada ................................... 70/16

Primary Examiner—Gary L. Smith
Assistant Examiner—Suzanne L. Dino
Attorney, Agent, or Firm—Wall and Roehrig

[57] ABSTRACT

A flexible braid of a soft, strong material, such as a flat braided nylon, utilized to engage a locking block which permits the braided material to pass freely in one direction, but which prevents movement of the material in an opposite direction. In this manner the braided material, which is formed in an endless loop, may be placed about the extremities of a person whose movement is sought to be controlled or restrained, and the loop tightened. The flexible material will tightly encircle the extremities sufficient to control or restrain their movement, but will not cut or gouge the person being restrained unless such person attempts to remove the restraining device. Because of the lightweight and inexpensive nature of the restraining device a law enforcement officer can comfortably and conveniently carry a number of these devices when on duty to facilitate arrests and control of multiple offenders.

7 Claims, 1 Drawing Sheet

RESTRAINING DEVICE

BACKGROUND OF THE INVENTION

This invention relates in general to restraining devices and, in particular, to a lightweight and flexible restraining device which may be utilized to secure the extremities of a person or animal sought to be restrained and/or to limit the mobility of such a person or animal. More specifically, but without restriction to the particular embodiment and/or use which is shown and described for purposes of illustration, this invention relates to a low-cost and lightweight restraining device which may be utilized to secure the extremities of a person while minimizing the potential injury that might be incurred to such a person while wearing or attempting to remove the restraining device, or to others if such person were to attempt to use the restraining device as a weapon against one seeking to apply the restraining device or control such person.

Restraining devices to immobilize persons or limit their mobility have been utilized for centuries. Such devices have included the type wherein the size or weight of the restraining device is the primary factor in immobilizing or restraining the person sought to be controlled. Other such devices have been permanently secured in a fixed position, and the person sought to be restrained is brought to the device and attached thereto. Such restraining devices are utilized primarily after the person sought to be restrained has been brought, under control, to the device and generally are not suitable for being carried by a person seeking to control or restrain another. These aforementioned devices were used primarily where the person sought to be restrained was under the control of another, with the device being used to immobilize the person after control had been established.

It is presently necessary for persons such as law enforcement personnel to carry with them devices which may be utilized to immobilize or restrain a person being taken into custody by the law enforcement officer. Such devices are used for establishing control over a person being taken into custody, as well as to maintain that control once custody has been established. Two of such devices which are commonly in use comprise rigid metal structures which are used to encircle either the wrist or ankles of a person sought to be taken into custody, referred to as "hand-cuffs", or to encircle or join the thumbs of such a person, referred to as "thumb-cuffs". While these devices are suitable for their intended purposes, because of the size and weight of such restraining devices the number of such "hand-cuffs" or "thumb-cuffs" which can be carried by a law enforcement officer is limited. In addition, it has been found that such devices have been used as weapons against the law enforcement officers by the person sought to be restrained, both when attempting to control such person or after the devices have been secured in place.

In an attempt to resolve some of these problems associated with prior art restraining devices, devices such as disclosed in U.S. Pat. Nos. 3,516,124 and 4,071,023, and the patents described therein, have been developed, as well as restraining devices similar to the plastic bundling ties used for cabling and bundling wires. These latter restraining devices are formed from a flat nylon strap and include a pre-formed strap head mounted at the end of the nylon strap which houses a high-strength steel barb permitting a one-way blocking action of the strap. The nylon strap is formed with a central groove running the length of the strap which permits the strap to be locked in a number of adjustable positions.

While such nylon strap or filament type of restraining devices are lighter weight and less expensive than conventional hand-cuffs or thumb-cuffs, such devices, due to the nature of the flat nylon strap or filament required, are stiff and, therefore, not easily carried. Furthermore the stiffness of such nylon strap or filament restraining devices is such that the devices are not comfortable when applied to the person sought to be restrained. Such restraining devices are also sensitive to temperature extremes, and it is recommended that they not be stored in direct sunlight.

The present invention provides a restraining or control device which is low-cost, lightweight and more comfortable for the person sought to be controlled. The control device of the present invention, therefore, is much less expensive than conventional "hand-cuffs" or "thumb-cuffs", and permits a law enforcement officer to comfortably carry a number of the restraining devices. The ability to readily carry a number of such restraining devices permits the control of more than one person, as in a multiple offender arrest situation, without necessitating maintaining such control at gunpoint which occurs when the officer is unable to carry a sufficient number of conventional "cuffs" to accommodate such arrests. The lightweight and flexibility of the present invention limits the potential use of the restraining device as a weapon against the arresting officer, and is also more comfortable on the person being restrained. Minimizing the irritation or discomfort to a person being placed in custody during a tense and highly-charged emotional situation, can eliminate unnecessary aggravation which might lead to a violent outburst.

SUMMARY OF THE INVENTION

It is, therefore, an object of this invention to improve devices for restraining or controlling a person.

Another object of this invention is to reduce the cost and weight of personal restraining devices in order to permit a sufficient number of such devices to be carried to control or restrain a number of individuals.

A further object of this invention is to minimize the potential of the restraining device being used as a weapon by the person being restrained against the person attempting to exercise control.

Still another object of this invention is to minimize the discomfort of a restraining device when applied to the person whose movement is sought to be controlled.

These and other objects are attained in accordance with the present invention wherein there is provided a flexible braid of a soft, strong material, such as a flat braided nylon, utilized to engage a locking block which permits the braided material to pass freely in one direction, but which prevents movement of the material in an opposite direction. In this manner the braided material, which is formed in an endless loop, may be placed about the extremities of a person whose movement is sought to be controlled or restrained, and the loop tightened. The flexible material will tightly encircle the extremities sufficient to control or restrain their movement, but will not cut or gouge the person being restrained unless such person attempts to remove the restraining device. Because of the lightweight and inexpensive nature of the restraining device a law enforcement officer can comfortably and conveniently carry a number of these devices when on duty to facilitate arrests and control of multiple offenders.

DESCRIPTION OF THE DRAWINGS

Further objects of the invention together with additional features contributing thereto and advantages occurring therefrom will be apparent from the following description of a preferred embodiment of the invention which is shown in the accompanying drawing with like reference numerals indicating corresponding parts throughout, wherein.

DESCRIPTION OF A PREFERRED EMBODIMENT

Figure 1:
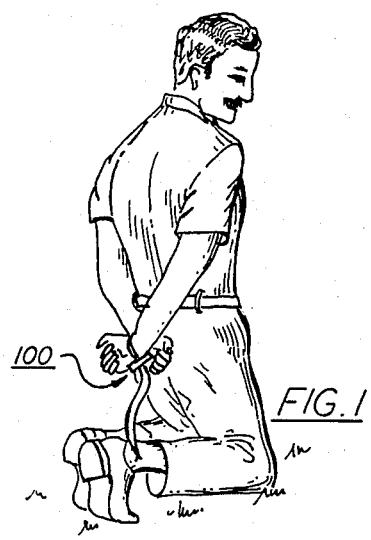
FIG. 1 is a perspective view of an individual being restrained or controlled by tee invention.
Figure 2:
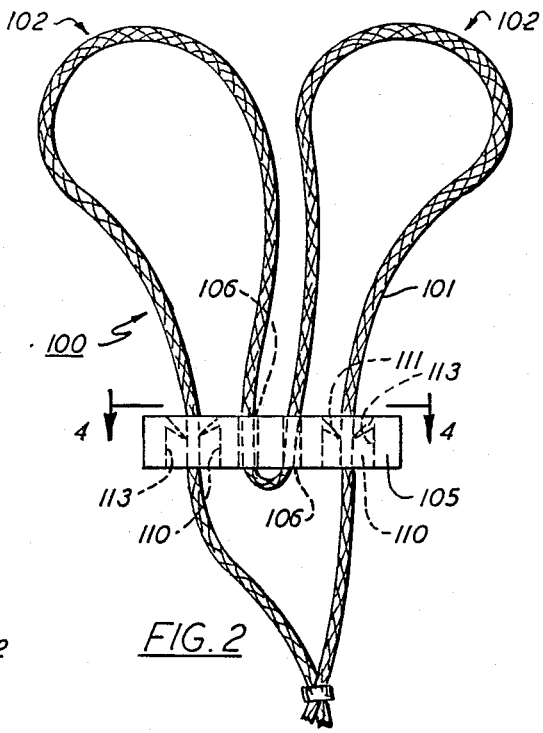
FIG. 2 is a planar view of the configuration of the restraining device as it appears prior to use.

Referring now to the drawings, there is shown in FIG. 1 a perspective view of an individual having his arms secured behind his back by the restraining device indicated by reference numeral 100. This restraining device, best illustrated in FIGS. 2 and 3, comprises an endless loop of a flexible non-stretchable material 101 such as nylon which has been formed in a flat braid to be passed through a locking block 105 in a manner to be described hereinafter in more detail. The flat braided nylon material 101 is preferably of a length about 28 inches with the ends joined to form an endless loop. The braid preferably is approximately 0.25 inches in width and 0.05 inches thick, with a tensile strength of approximately 400 to 600 pounds.

As illustrated, the endless loop of braided nylon 101 is passed through the locking block 105 in a serpentine manner forming two loops 102 which in use are placed about a portion or the extremities of a person or animal sought to be restrained. While it is to be understood that the invention may be utilized to restrain or control the movement of animals, and multiples of the device 100 may be utilized in various combinations to group persons or animals together, as well as to fasten either to stationary objects, for purposes of illustration the invention will be described with reference to its use as a replacement for conventional hand-cuffs. However, it is to be understood that the invention is not intended to be limited to that application.

The locking block 105 through which the braided nylon material 101 is passed includes a first pair of apertures 106 formed in the locking block and through which the braided nylon material may be freely passed in either direction. While the embodiment illustrated in the drawings is preferable, it is to be understood that the locking block 105 may be constructed such that the nylon braid 101 is entrapped in the locking block, eliminating the apertures 106.

Figure 3:
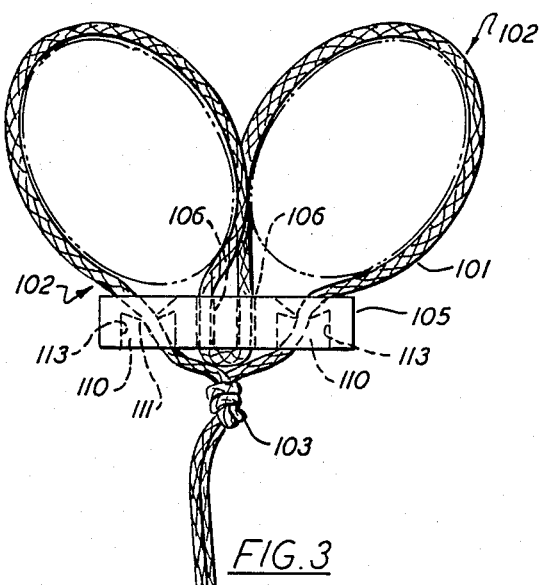
FIG. 3 is a planar view similar to FIG. 2 to better illustrate the configuration of the restraining device after it has been applied to a person whose movement is sought to be controlled or restrained.
Figure 4:
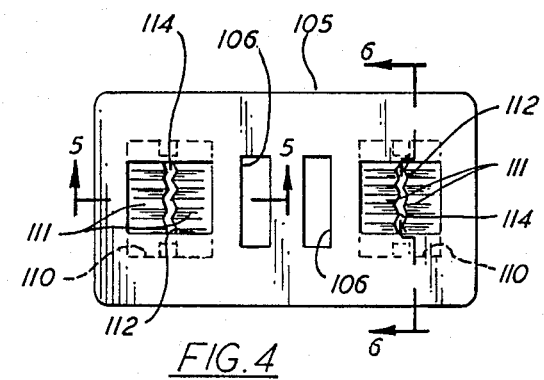
FIG. 4 is an enlarged planar view of a locking block used for limiting the direction of movement of the flexible braided material to a single direction, taken in the direction of lines 4—4, with the braided material removed to better illustrate the locking features.
Figure 5:
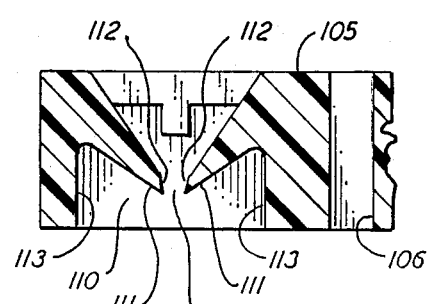
FIG. 5 is an enlarged partial sectional view of the locking block illustrated in FIG. 4 taken along lines 5—5.
Figure 6:
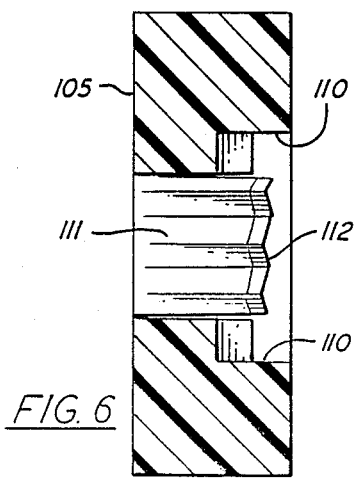
FIG. 6 is an enlarged partial section view of the locking block illustrated in FIG. 4 taken along lines 6—6.

As will also be seen in the drawings, a second pair of apertures 110 is formed in the locking block 105. This second aperture pair 110 each includes a lock means comprising a cantilevered jaw member 111 which is secured at one end by being formed from a portion of an interior wall 113 which defines in part the second aperture. As illustrated in the drawings, and in particular the enlargements illustrated in FIGS. 4-6, the jaw members 111 extend across the second aperture 110 for forming a one-way throat 114 through which the endless loop of nylon material 101 may be passed in a first direction to tighten the endless loop about the wrist of a person being restrained, such as illustrated in FIG. 3. The positioning of the jaw members 111 in this manner prevents the movement of the braid 101 in a loosening direction opposite to the tightening direction. For this purpose, the free end of each of the jaw members 111 is serrated 112 and the serrations positioned complementary to each other so that a one-way throat 114 is crenelated and formed with a substantially uniform width therebetween.

When the pair of loops 102 have been placed about the wrist of a person and drawn tightly thereabout as illustrated in FIG. 3, the length of braided material 101 remaining after tightening about the wrist can be tied upon itself, such as through the use of an overhand knot 103 to provide a better lead for the person taken into custody, and to add the strength of the nylon locking block 105 to further inhibit pulling the flat braided nylon material 101 through the lock means in an attempt to loosen the loop after being tightened about the wrist.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A restraining device for use in limiting the movement of a person sought to be restrained comprising
 a loop formed from a flexible non-stretchable material for encircling a portion or extremity of the person sought to be restrained,
 a locking block carried by said loop of material and having at least tow locking aperture means formed therein through which said material is movable through each of said locking aperture means only in a first direction,
 each one of said two locking aperture means being formed as an integral portion of said locking block and including lock means positioned therein to engage said material when passing therethrough,
 said lock means including a cantilevered jaw member secured at one end to a wall defining in part said locking aperture means, and said cantilevered jaw member extending across said locking aperture means towards an opposite wall of said locking block forming in part said locking aperture means for forming a one-way throat through which said material loop may pass in a first direction of movement to tighten said loop about the portion or extremity of the person sought to be restrained, but which will automatically engage said material preventing the movement thereof in a reverse direction to prevent the loosening of said loop after being tightened about the person sought to be restrained.

2. A restraining device for use in limiting the movement of a person sought to be restrained comprising an endless loop of flexible non-stretchable material for encircling a portion or extremity of the person sought to be restrained, a locking block carried on said endless loop and having at least two unrestricted aperture means formed therein through which said endless loop is formed into two side-by-side freely movable loops, and at least two locking aperture means formed therein through which said endless loop is movable only in a first direction, each one of said locking aperture means including lock means positioned therein to engage said endless loop when passing therethrough, said lock means including at least two cantilevered jaw members, each one of said jaw members being secured at one end to a wall defining in part said locking aperture, and said jaw members extending across said locking aperture towards each other for forming a one-way throat through which said endless loop may pass in a first direction through said locking aperture means to tighten said endless loop about the portion or extremity of the person sought to be restrained, but which will automatically engage said endless loop preventing the movement thereof in an opposite direction to prevent the loosening of the endless loop after being tightened about the person sought to be restrained.

3. The restraining device as defined in claim 2 wherein said adjacent portions of said pair of cantilevered jaw members are serrated with the serrations of each jaw member being complementarily positioned relative to the other for forming a crenulated throat of substantially uniform width.

4. The restraining device as defined by claim 2 wherein said endless loop is passed through said pair of unrestricted and said pair of locking apertures to form two adjustable loops for encircling portions or extremities of the person sought to be restrained.

5. The restraining device as defined by claim 4 wherein said endless loop is of a length sufficient such that upon encircling portions of extremities of the person sought to be restrained and tightening said loops thereabout by passing said loop through said lock means in said first tightening direction, the free portion of said endless loop which passes through said lock means and is not encircled thereabout is sufficient to be tied upon itself against a side of said locking block opposite to a side locking block from which the encircling portions extend.

6. The restraining device as defined by claim 5 wherein said endless loop of flexible non-stretching material is nylon formed into a flat braid.

7. A restraining device for use in limiting the movement of one sought to be restrained comprising an endless loop of flexible non-stretchable material for encircling a portion or extremity of one sought to be restrained, a locking block carried on said endless loop and having at least two open aperture means formed therein through which said endless loop is freely movable, and at least two restricted aperture means formed therein through which said endless loop is movable only in a first direction to form two side-by-side adjustable loops, each of said two restricted aperture means including lock means positioned therein to engage said endless loop when passing therethrough, said lock means including at least two cantilevered jaw members, each one of said cantilevered members being secured at one end to a wall defining in part said restricted aperture and extending across said aperture towards each other for forming a one-way throat through which said endless loop may pass to tighten said side-be-side adjustable loops about the portion or extremity of one sought to be restrained, but which will automatically engage said endless loop preventing the movement thereof in an opposite direction to prevent the loosening thereof after being tightened by pulling said endless loop through said lock means in said first direction.

* * * * *

UNITED STATES PATENT AND TRADEMARK OFFICE
CERTIFICATE OF CORRECTION

PATENT NO.   : 4,854,138
DATED        : August 8, 1989
INVENTOR(S)  : Robert S. Charland It is certified that error appears in the above-identified patent and that said Letters Patent is hereby corrected as shown below:

Col. 4, line 58, "tow" should read --two--.

Col. 6, line 32, after "each", please insert --one--.

Signed and Sealed this

Fourteenth Day of August, 1990

Attest:

HARRY F. MANBECK, JR.

*Attesting Officer*      *Commissioner of Patents and Trademarks*